(12) United States Patent
Corby et al.

(10) Patent No.: US 6,299,089 B1
(45) Date of Patent: Oct. 9, 2001

(54) LIGHT TIGHT CARTRIDGE FOR A ROLL OF WEB MATERIAL

(75) Inventors: Kenneth D. Corby, Rochester; Thomas D. Jensen, Holley; John A. Kappler, Macedon, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/540,465

(22) Filed: Mar. 31, 2000

(51) Int. Cl.$^7$ .................................................. G03B 23/02
(52) U.S. Cl. ........................................ 242/348.4; 396/513
(58) Field of Search ................................ 242/348, 348.4; 396/512, 513

(56) References Cited

U.S. PATENT DOCUMENTS

| | | | |
|---|---|---|---|
| 3,834,650 | * | 9/1974 | Hall ........................................ 242/348 |
| 4,647,170 | * | 3/1987 | Stoneham ............................... 242/348 |
| 5,153,625 | * | 10/1992 | Weber ................................. 242/348.4 |
| 5,193,759 | | 3/1993 | Bigelow et al. . |
| 5,246,111 | | 9/1993 | Shibazaki et al. . |
| 5,275,283 | | 1/1994 | Akao . |
| 5,435,499 | * | 7/1995 | Hirose .................................. 242/348.4 |
| 5,565,959 | | 10/1996 | Yamamoto et al. . |
| 5,813,622 | * | 9/1998 | Von Alten ............................... 242/348 |
| 5,855,334 | * | 1/1999 | Abe et al. ............................... 242/348 |
| 5,860,613 | * | 1/1999 | Holland ............................... 242/348.4 |
| 5,921,494 | * | 7/1999 | Schulz et al. .......................... 242/348 |
| 5,971,311 | * | 10/1999 | Fujii et al. .......................... 242/348.4 |

* cited by examiner

*Primary Examiner*—Emmanuel M. Marcelo
(74) *Attorney, Agent, or Firm*—Nelson Adrian Blish

(57) ABSTRACT

A light tight cartridge for a roll of web material (32) comprises a can (40), which contains the roll of web material (32). A first protrusion (52) on the can (40) rotatably supports the roll of web material (32). A cover (42) fits over the can (40) in a light tight fashion. A second protrusion (52) rotatably supports the roll of web material (32). In one embodiment, light blocking material is provided at a slot (44) in the can (40) and at a cover extension (48) to prevent light leaks into the cartridge (30). In another embodiment of the invention, the cover (42) is ultrasonically welded to the can (40).

9 Claims, 8 Drawing Sheets

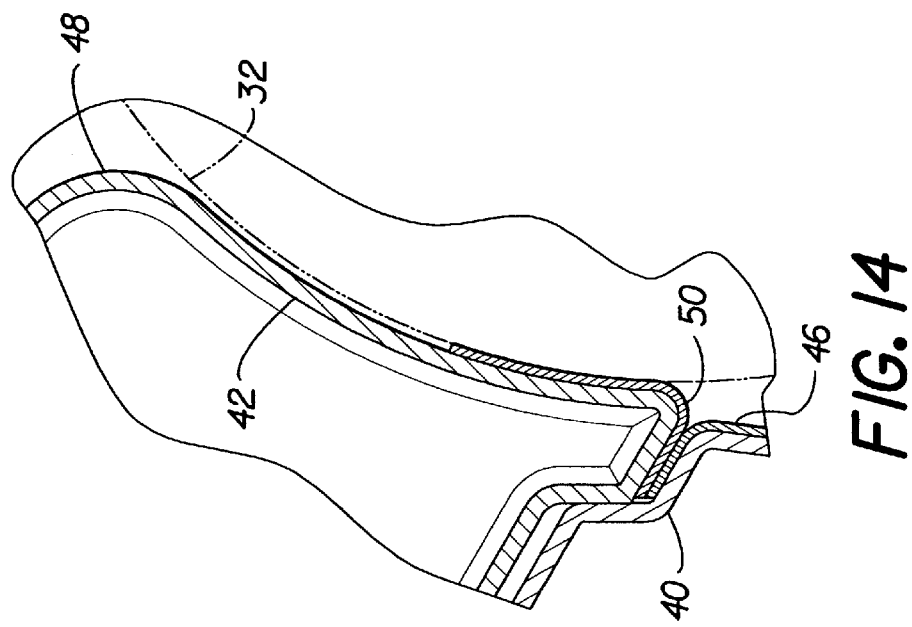
FIG. 14
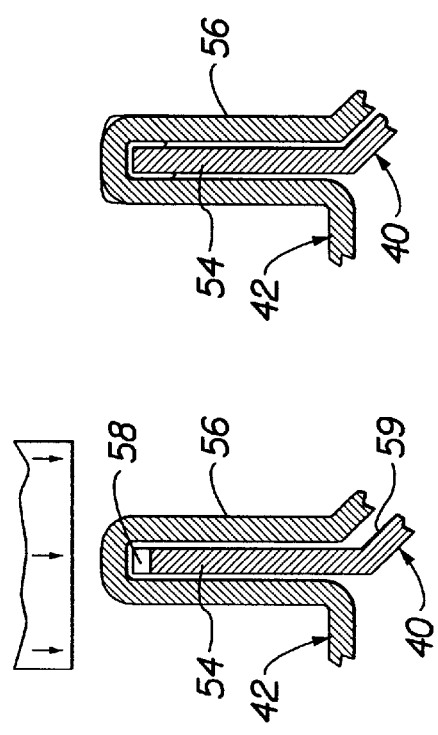
FIG. 13
FIG. 12

LIGHT TIGHT CARTRIDGE FOR A ROLL OF WEB MATERIAL

FIELD OF THE INVENTION

The present invention relates in general to a cartridge for a roll of web material and in particular, to a light tight cartridge for photographic film used in microfiche printers.

BACKGROUND OF THE INVENTION

In storing documents onto photosensitive material such as microfiche, a large number of documents are copied on rolls of photographic film. It is desirable to minimize the need for operations personal to continually change out cartridges. It is also desirable for cartridges containing photographic film to have a large capacity and not require frequent change out.

There are four basic types of construction methods for light tight film containers used to dispense web rolls. The first type is complicated and requires many parts to manufacture. It usually contains rollers, doors or other devices inside the cartridge, and the web roll. How these cartridges are constructed varies, however, a typical example is shown in U.S. Pat. No. 5,565,959. A second type of cartridge uses three basic parts, two end caps which contain a flexible or semi-flexible body. An example of this type is shown in U.S. Pat. No. 5,275,283. A third type of cartridge is a two piece box split at the exit slot to facilitate installing the light lock material and web roll. A typical example of this type cartridge is shown in U.S. Pat. No. 5,193,759. The fourth type of cartridge is a box with an insert inside that supports the web role. The last flap, which closes on the box, is usually the light lock area. An example of the fourth type of cartridge is U.S. Pat. No. 5,246,111.

There are advantages and disadvantages to each type of cartridge described. For example, type I cartridges tend to have excellent performance and long life but can have a significant cost. They tend to be used in situations where the web roll can be loaded into cartridges in a light free environment. Heavy rolls and wide rolls can be easily adapted to type I cartridges.

Type II cartridges tend to be used for wider rolls that are light or medium weight. They are cost-effective but care must be used to avoid accidentally opening the light lock area and exposing the roll of film. The fastening method sometimes involves glue which can also cause photographic reactions due to the out gassing of the glue as it hardens.

Type III cartridges tend to be used with narrow, medium, or heavy weight rolls. They can also be used as a reasonable compromise for long life and cost effectiveness. Unfortunately, for large diameter heavy web rolls, the tooling costs can be extremely high driving up the unit cost. However, they are rather effective for medium weight rolls. A high volume of this type of cartridge is required in order for the product to be cost effective.

Type IV cartridges are suitable for use with light weight rolls only. They are also restricted to narrow width rolls due to the extreme flexibility of the light lock flap. Simply picking up the cartridge may expose a wider roll to light by bending the light lock area. Heavy rolls can not be used in a cardboard or paperboard box of this type. Another problem associated with this type of cartridge is maintaining light integrity at all the corners and seams because of the weight of heavy rolls.

As market pressures cause manufacturers to reduce the price of microfiche film, there is a need for a very large diameter, narrow width, web roll, packaged in a low-cost cartridge. Currently the market does not offer this option.

SUMMARY OF THE INVENTION

It is an object of the present invention to reduce part count in a microfiche cartridge, provide more than one functional use of the cartridge, provide compliant light lock material, and provide for recycling of the cartridge. It is also an object of the present invention to provide a light tight cartridge capable of handling a large diameter roll of web material, which is resistant to unwinding of the spool of web material during transport.

According to one aspect of the present invention, a light tight cartridge for a roll of web material comprises a can, which contains the roll of web material. A first protrusion on the can supports the roll of web material for rotation. A cover fits over the can in a light tight fashion. A second protrusion rotatably supports the roll of web material. In one embodiment, light tight material is provided at a slot in the can and on cover extension to prevent light leaks into the cartridge. In another embodiment of the invention, the cover is ultrasonically welded to the can.

An advantage of the present invention is that the can be constructed of only two parts and is therefore easy to assemble.

Another advantage of the present invention is that the cartridge, including the light lock material, can be easily recycled.

Yet another advantage of the present invention is that the light lock material acts as a break on the roll of web material preventing unspooling of the roll of web material during transportation.

The invention and its objects and advantages will become more apparent in the detailed description of the preferred embodiment presented below.

BRIEF DESCRIPTION OF THE DRAWINGS

FIGS. 12 and 13 are a cross-sectional views of a portion of the cartridge before and after ultrasonic sealing.

FIG. 14 is a sectional view of the cartridge showing the breaking effect of light blocking material.

DETAILED DESCRIPTION OF THE INVENTION

Figure 1:
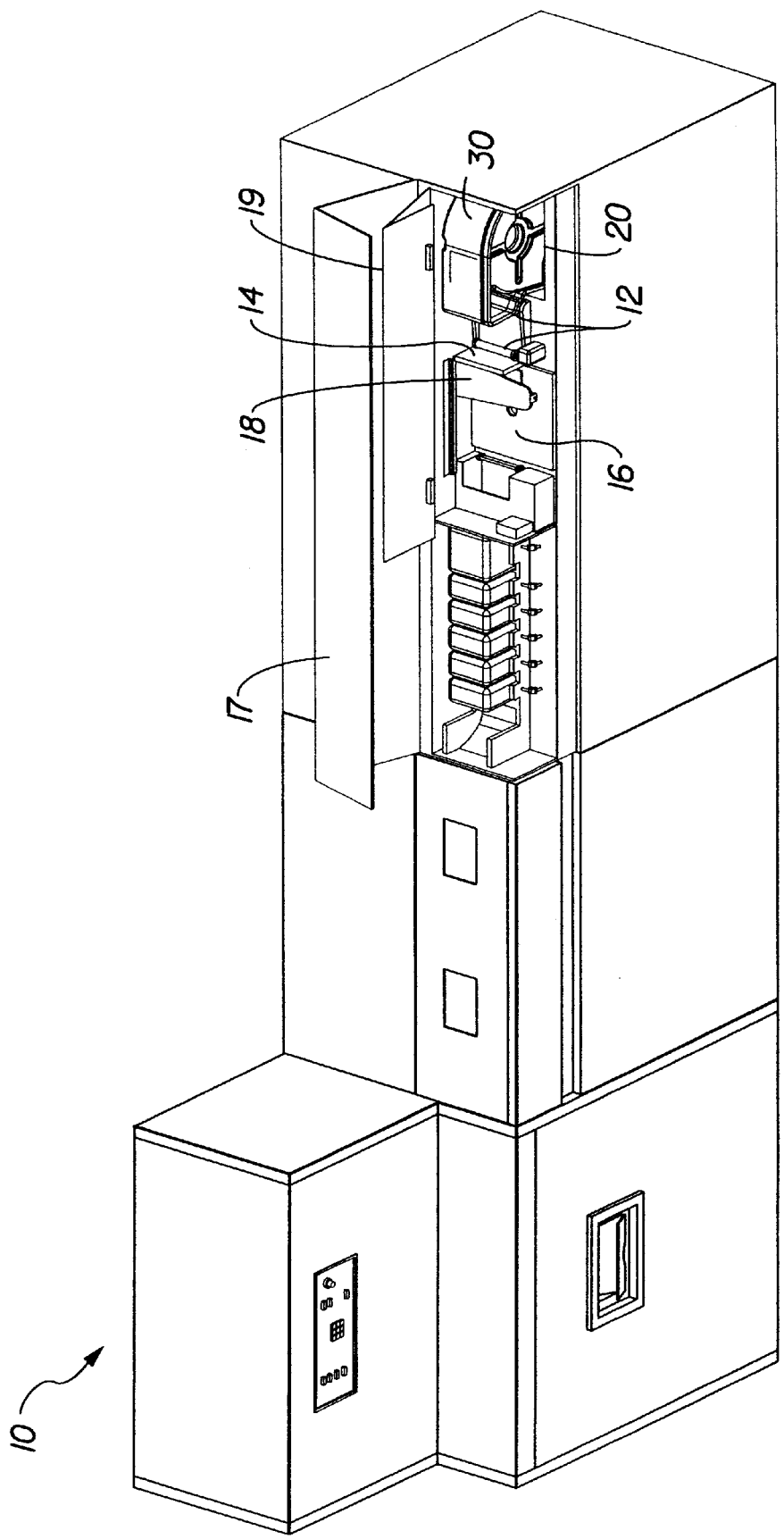
FIG. 1 is a perspective view of an apparatus for producing microfiche.
Figure 2:
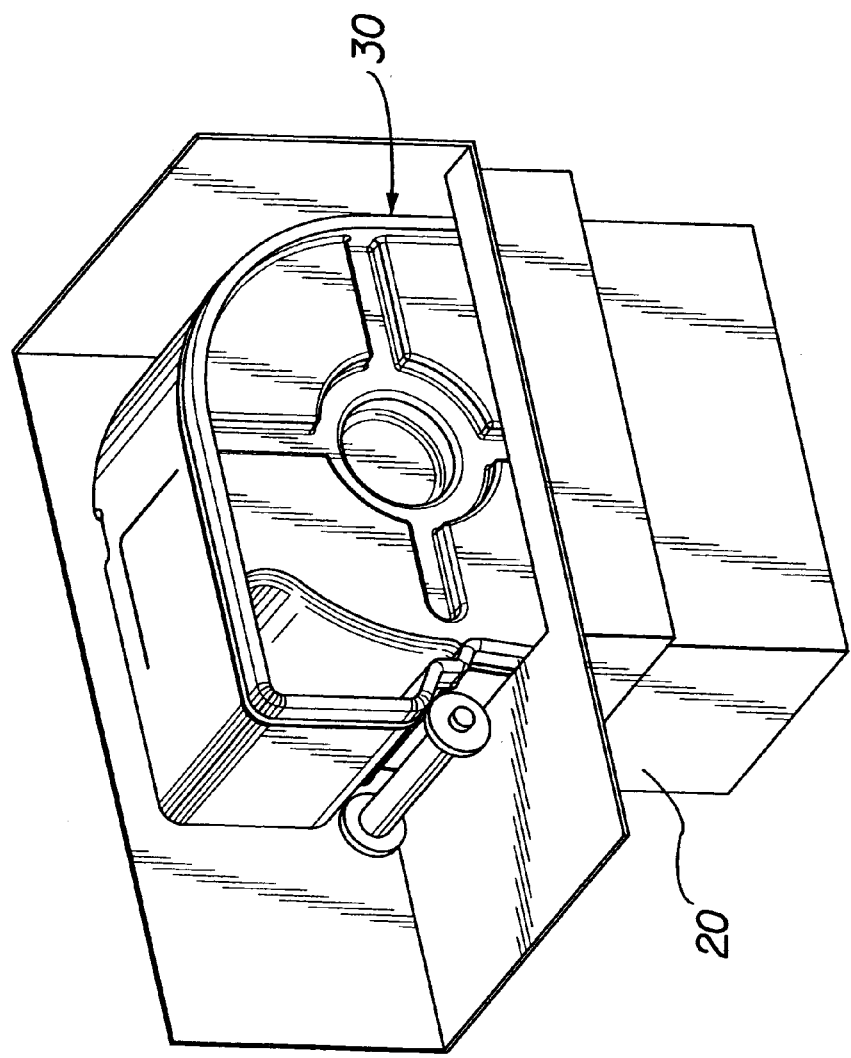
FIG. 2 is a perspective view showing the cartridge in the nest.

Referring now to FIG. 1, an apparatus for producing microfiche is referred to in general by numeral 10. The apparatus for producing microfiche is referred to as a COM (computer output to microfiche) unit by the industry. Apparatus 10 is comprised generally of a feed mechanism 12, a guillotine cutter 14, a bed 16, and a light writing device 18 for printing images onto photographic film such as microfiche film. An apparatus light lock cover 19 shown in the open position in FIGS. 1 and 2 provides a light tight environment during operation of the machine. Access cover 17 is an aesthetic cover.

In operation the feed mechanism 12 transports a web of film to the guillotine cutter 14, which cuts a portion of the film into pieces called microfiche. The microfiche is held on the bed 16 and a light writing device 18, for example a LED printhead, writes information on the microfiche. The cartridge, is shown inserted into the nest in FIG. 2. The cartridge dispenses photographic film into the apparatus 10. The light lock cover 19 and access cover 17, shown in FIG. 1, are closed during operation to prevent exposing the film.

Figure 3:
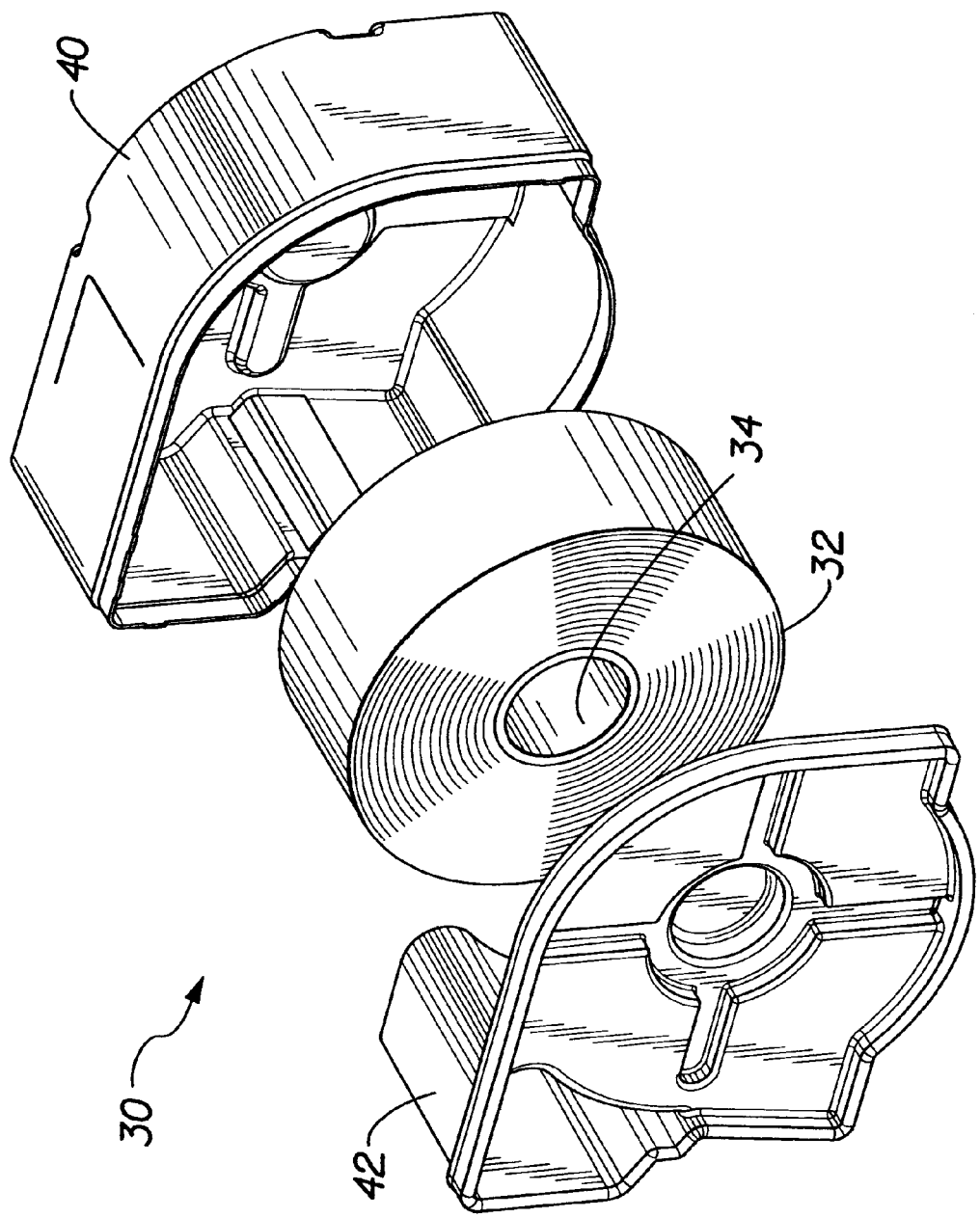
FIG. 3 is a perspective, exploded view of the cartridge showing a cover, a roll of web material, and a can.

A cartridge 30 fits in a portion of the apparatus 10, commonly referred to as a nest 20, as shown in FIGS. 2 and 3.

Figure 5:
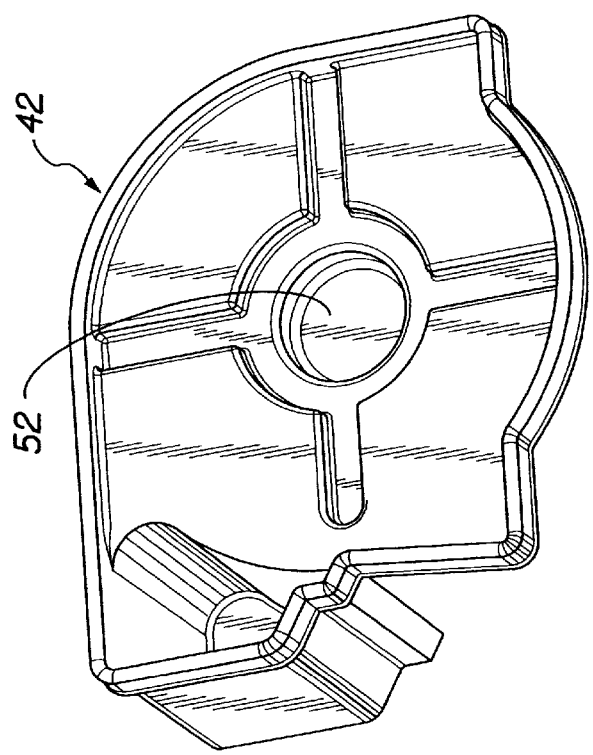
FIGS. 4 and 5 are perspective views of the can and cover shown in FIG. 3.
Figure 4:
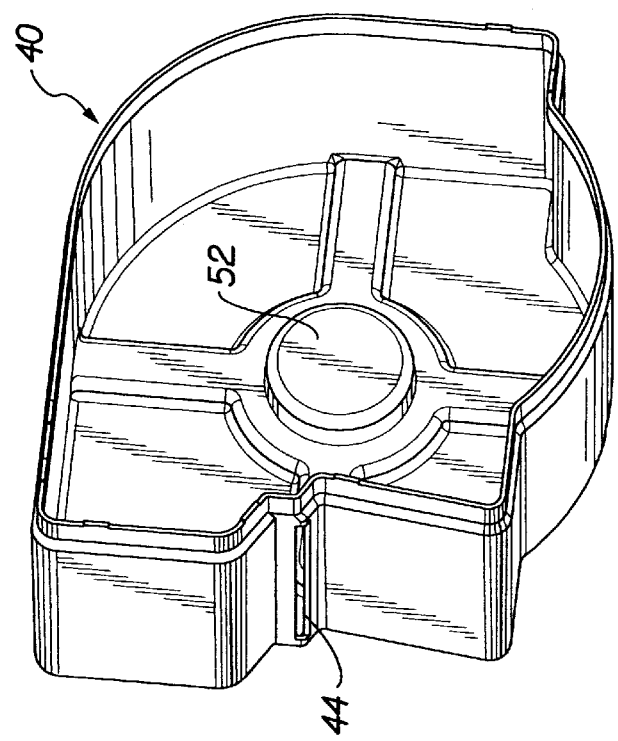

Referring now to FIG. 3, a large web roll 32, is encased in cartridge 30, which is comprised of a can 40 and cover 42. Can 40 and cover 42 are shown in more detail in FIGS. 4 and 5. The cartridge 30 is comprised of two pieces, can 40 and cover 42, in order to minimize the number of parts required. In the center of both cover 42 and can 40, protrusions 52 support the web roll.

Can 40 and cover 42 are comprised of a thermoformed material. A thermoformed material used in a preferred embodiment of the present invention is a thermoplastic such as polystyrene. This type of thermoplastic material can be easily remelted and formed into other parts and therefore is useful in recycling the cartridges. Since extraneous parts are not used in the manufacture of the cartridge the entire cartridge can be easily recycled.

Figure 7:
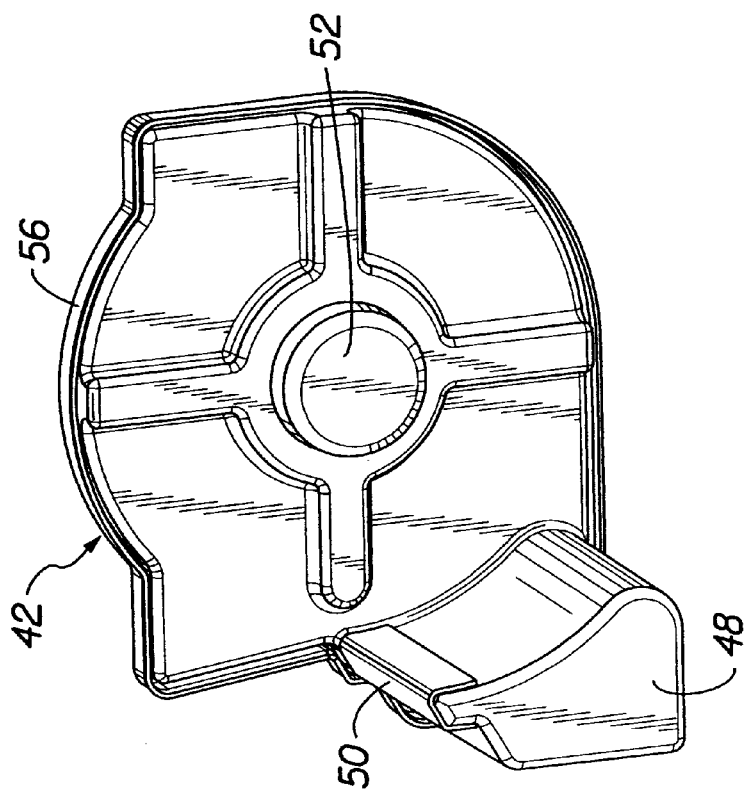
FIGS. 6 and 7 are perspective views of the can and cover showing the light blocking material applied to a slot in the can.
Figure 6:
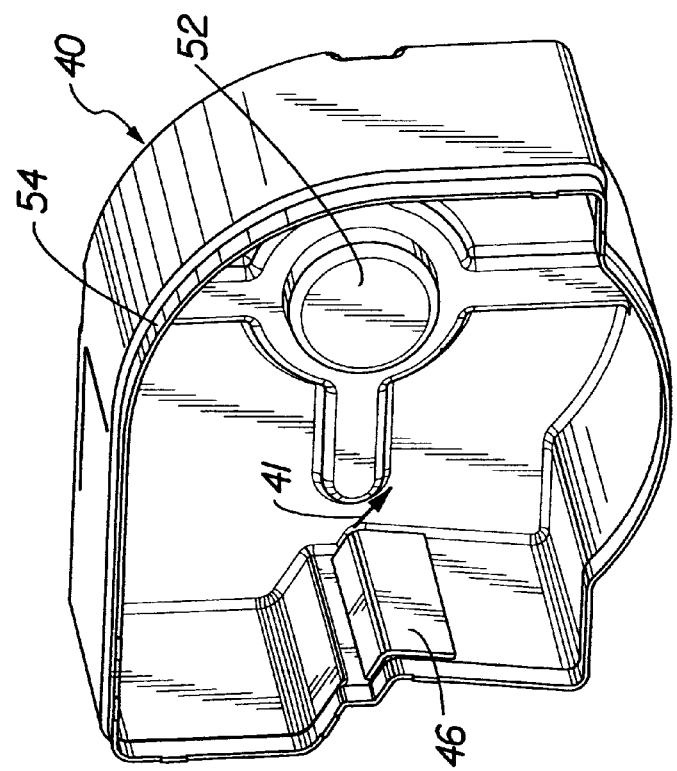
Figure 9:
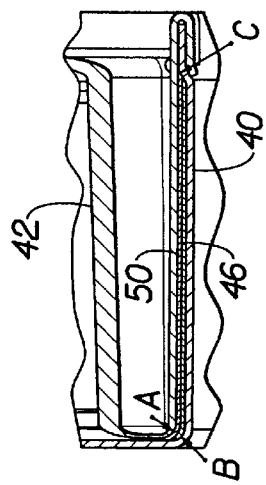
FIG. 9 is a sectional views along line 6—6 of FIG. 8 showing the extent of light blocking material.
Figure 8:
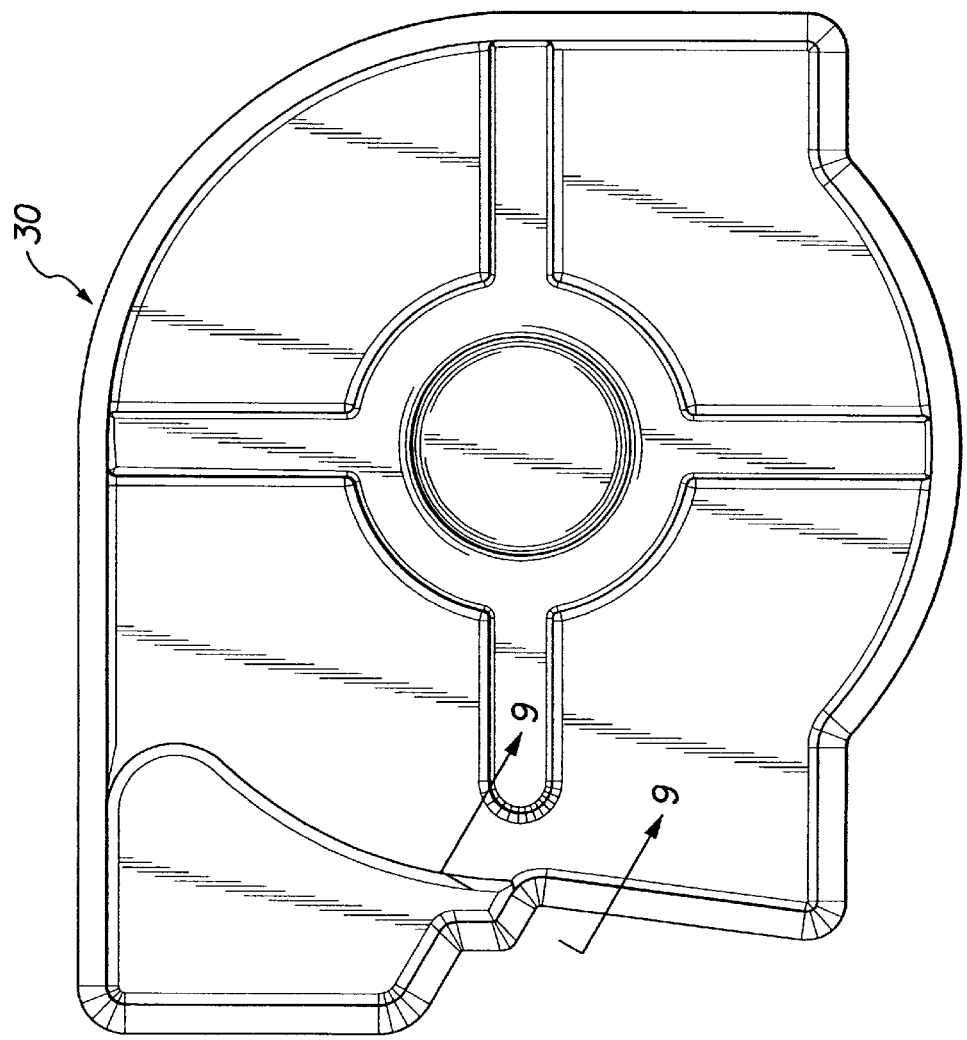
FIG. 8 is a plan view of the cartridge.

A slot 44 is cut in the side can 40 to allow the web roll 32 to exit the cartridge 30. To form a light lock area, and prevent light from entering the cartridge 30, a compliant light blocking material 46 is applied on the inside of the can 40 near slot 44, shown in FIGS. 6 and 7. A cover extension 48 on cover 42 extends downward through the light blocking area, and a second compliant light blocking material 50 is applied, opposed to the light blocking material 46. Light entering slot 44 would normally be scattered as it strikes light blocking material 46 and would leak past an edge of light blocking materials 46 and 48 as shown by arrow 41 in FIG. 6. Extending light blocking materials 46 and 50 around radii A, B, and C, as shown in FIG. 9, prevents light from being scattered around the edge of light blocking material. FIG. 9 is a sectional view along lines 9—9 of FIG. 8.

Figure 11:
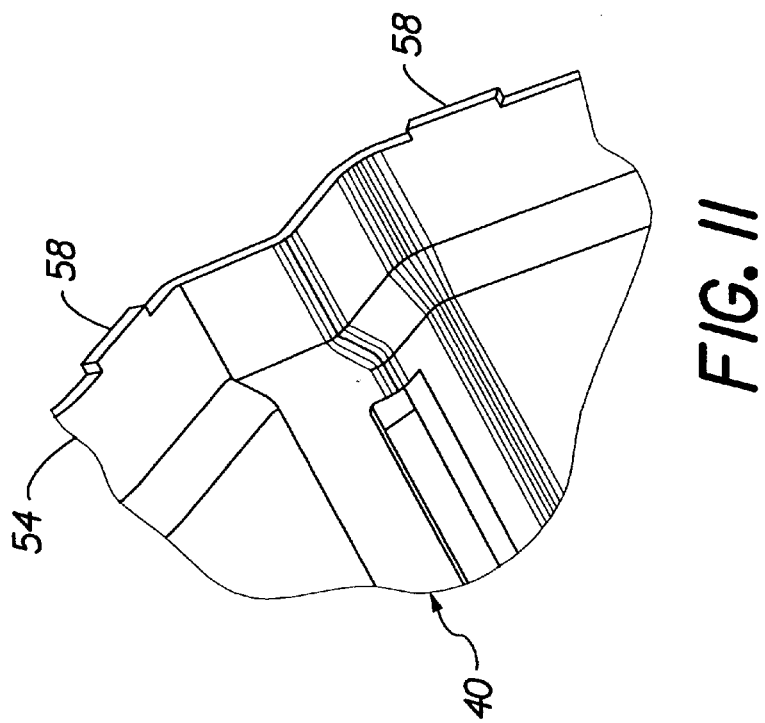
FIG. 11 is an enlarged view of a portion of the can shown in FIG. 10.
Figure 10:
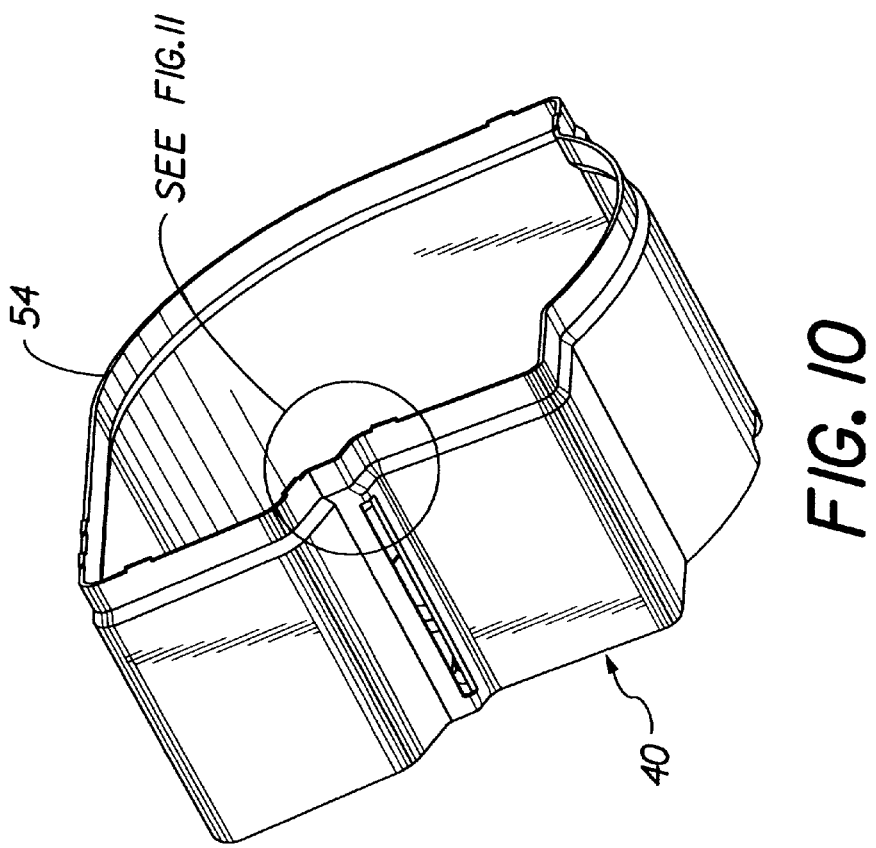
FIG. 10 is a perspective view of the can showing an edge.

The cover 42 fits tightly over the can 40. An overlap 56, shown in more detail in FIGS. 12 and 13 fits over an edge 54 on the cover 42. Edge 54 is shown in more detail in FIGS. 10 and 11. A recess 59 in edge 54 is provided so the cartridge 30 will sit flat when stood up on its edge.

The can 40 has raised sections 58 at the can and cover interface, that fits into the overlapping cover as shown in FIGS. 12 and 13. Ultrasonic energy is supplied directly to the top of the cover to melt the raised sections 58 and seal the cover to the can. This prevents accidental opening of the cartridge exposing the web roll to light. By using a thermoformed can and cover, a large cartridge can be made for a relatively low-cost. Also, by extending the cover extension all the way to the bottom of the can bottom to act as a light lock support area, the number of parts is minimized.

A web roll with a large diameter will press against light blocking material 50 which acts as a break to prevent unwinding of the web roll 32 during transportation without substantially increasing the pull forces of the web as the web is fed out of the cartridge into the machine. As the web roll decreased in diameter as web material is drawn out of the cartridge, web contact with the light blocking material disappears.

A core 34 of the web roll, shown in FIG. 3, is made out of a material similar to the can and cover, i.e. thermoformed material, and the entire cartridge can be recycled as one unit. The compliant light lock material does not significantly affect the recycling stream. The compliant light lock material in the preferred embodiment of the present invention is a compliant foamed material covered with a low friction surface such as cloth. The volume of the compliant light lock material is relatively small.

Regardless of the length of the light blocking material used to keep the light out of the cartridge, light can penetrate the cartridge by traveling through the film directly into of the cartridge. This phenomenon is similar to the process which is used to transmit light in fiber optics. Since a section of film is left extending outside the cartridge it must be covered with an opaque device to prevent fogging of the film inside of the cartridge. One solution is an opaque envelope placed over the end of the film, which partially slides back into the slot. This keeps all the expose light away from the end of the film. In yet another embodiment, the entire end of the cartridge, including the film leader, is covered, with a device commonly referred to as a hood.

The invention has been described in detail with particular reference to certain preferred embodiments thereof, but it will be understood that variations and modifications can be effected within the scope of the invention.

PARTS LIST

10. Apparatus
12. Feed mechanism
14. Guillotine cutter
16. Bed
17. Access cover
18. Light writing device
19. Light lock cover
20. Nest
30. Cartridge
32. Web roll
34. Core
40. Can
41. Arrow
42. Cover
44. Slot
46. Light blocking material
48. Cover extension
50. Light blocking material
52. Protrusions
54. Edge
56. Overlap
58. Raised sections
59. Recess

What is claimed is:

1. A light tight cartridge for a roll of web material comprising:

a can for containing said roll of web material;

a first protrusion on said can for rotatably supporting said roll of web material;

a cover for said can which fits said can in a light tight fashion;

a second protrusion on said cover which rotatably supports said roll of web material;

wherein a first light blocking material on a cover extension and a second light blocking material on a wall of said can prevent light from entering said cartridge; and wherein said cover extension fits inside said can.

2. A light tight cartridge for a roll of web material as in claim 1 wherein said first and said second protrusions do not contact each other.

3. A light tight cartridge for containing a roll of web material as in claim 1 wherein said first protrusion is molded into said can and said second protrusion is molded into said cover.

4. A light tight cartridge for containing a roll of web material as in claim 1 wherein a cover overlap and a can edge are ultrasonically welded to said can.

5. A light tight cartridge for containing a roll of web material as in claim 1 wherein a first light blocking material on a cover extension and a second light blocking material on a wall of said can prevent light from entering said cartridge.

6. A method for manufacturing a light tight cartridge for a roll of web material comprising the steps of:

providing a can having a first protrusion for rotatably supporting said roll of web material;

providing a slot in said can for said web material;

providing a first layer of light blocking material adjacent to said slot;

providing a cover having a second protrusion for rotatably supporting said roll of web material;

providing an extension on said cover which fits into said can;

providing a second layer of light blocking material which fits snuggly against said roll of web material and said first layer of light blocking material;

mounting said roll of web material in said can;

threading said film through said slot in said can; and sealing said cover to said can.

7. A method as in claim 6 wherein said cover is sealed to said can ultrasonically.

8. A light tight cartridge for containing a roll of web material comprising:

a can for containing said roll of web material;

a first protrusion on said can for rotatably supporting said roll of web material;

a cover for said can which fits said can in a light tight fashion;

a second protrusion on said cover which rotatably supports said roll of web material; and wherein said second light blocking material is in contact with said roll of web material when said roll is full, and prevents unwinding of said roll.

9. A light tight cartridge for containing a roll of web material as in claim 8 wherein said first light blocking material on a cover extension and a second light blocking material on a wall of said can prevent light from entering said cartridge.

* * * * *